Aug. 15, 1961  V. L. HELGESON ET AL  2,995,985
BOMB RELEASE MECHANISM DELAY COMPENSATION COMPUTER
Filed July 16, 1956  2 Sheets-Sheet 1

INVENTORS
Virgil L. Helgeson &
BY Edward J. Lopez

E. W. Christen
ATTORNEY

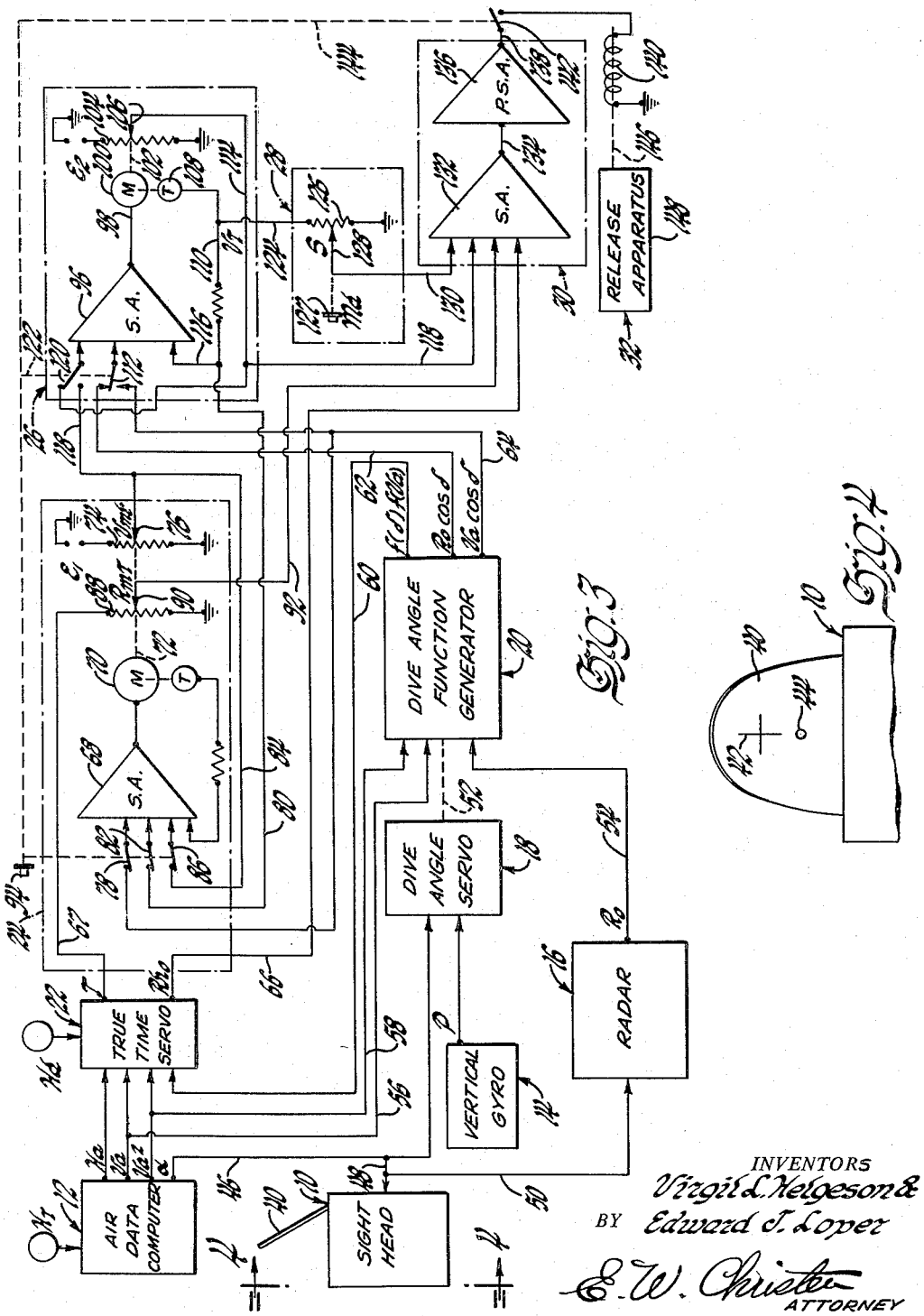

United States Patent Office 2,995,985
Patented Aug. 15, 1961

2,995,985
BOMB RELEASE MECHANISM DELAY
COMPENSATION COMPUTER
Virgil L. Helgeson and Edward J. Loper, Milwaukee, Wis., assignors to General Motors Corporation, Detroit, Mich., a corporation of Delaware
Filed July 16, 1956, Ser. No. 598,050
2 Claims. (Cl. 89—1.5)

This invention relates to bombing computer systems and more particularly to mechanism delay compensation for such computer systems.

Bombing computers are known which are adapted to provide a release signal when the aircraft path is tangent to a predicted bomb trajectory intersecting the target. In one known type of computer, development of the release signal is based upon continuous evaluation of functionally related signals which represent terms of horizontal and vertical distance equations which relate the predicted bomb trajectory, and the aircraft and target positions. A system of this type is disclosed and claimed in the copending United States application Serial No. 598,034, filed July 16, 1956, B-24,852 for bombing computer filed on even date herewith by Virgil L. Helgeson and Edward J. Loper and assigned to the assignee of the present invention.

It is known that electromechanical devices, such as the bomb release mechanism of a bombing computer system, have a definite time of operation, or time delay. This time delay, which occurs between the receipt of an actuating signal and the response effect of the mechanism, may be of small magnitude in absolute value; however, the time delay is sufficient to introduce substantial inaccuracies in bombing computer systems. In such systems, the time delay is translated into distance error, and the actual release point may depart from the computed release point by an appreciable distance due to the high speed of the bombing aircraft. Compensation for mechanism delay, in order to be reliable and accurate under all flight conditions, must take into account the variable factors which influence the amount of distance error attributable to the time delay.

Accordingly it is an object of this invention to provide a bombing computer system in which the bomb release signal is caused to anticipate the desired release point, to compensate the time delay of the bomb release mechanism.

It is another object of this invention to provide compensation for a mechanism time delay which varies in accordance with the operating conditions of the aircraft.

Another object of the invention is to provide time delay compensation in a bombing computer system of a magnitude corresponding to the velocity of the aircraft.

It is a further object of the invention to provide a bombing computer system of the type which develops a release signal by continuous evaluation of horizontal and vertical distance equations which includes compensation of a magnitude corresponding to the predicted distance to be traversed by the aircraft during the delay interval.

A further object of the invention is to provide a bombing computer system with time delay compensation of a magnitude corresponding to the product of aircraft velocity relative to the target and the time delay of the release mechanism.

In accordance with this invention a bombing system is provided comprising a computer for developing a release signal which corresponds to a selected target and which initiates actuation of a release mechanism. The computer receives signals which are functionally related to determine the release point and a compensation signal corresponding to the time delay and combines the signals to cause the release signal to anticipate the release point so that the bomb release coincides with the computed bomb release point. The compensation signal corresponds to the predicted distance to be traversed by the aircraft during the delay and is derived as a function of the aircraft velocity and the mechanism time delay.

A more complete understanding of the invention may be had from the detailed description which follows, taken in conjunction with the accompanying drawings in which:

FIGURE 3 is a diagrammatic illustration of the inventive bombing computer system; and FIGURE 4 is a view taken on lines 4—4 of FIGURE 3.

Figure 1:
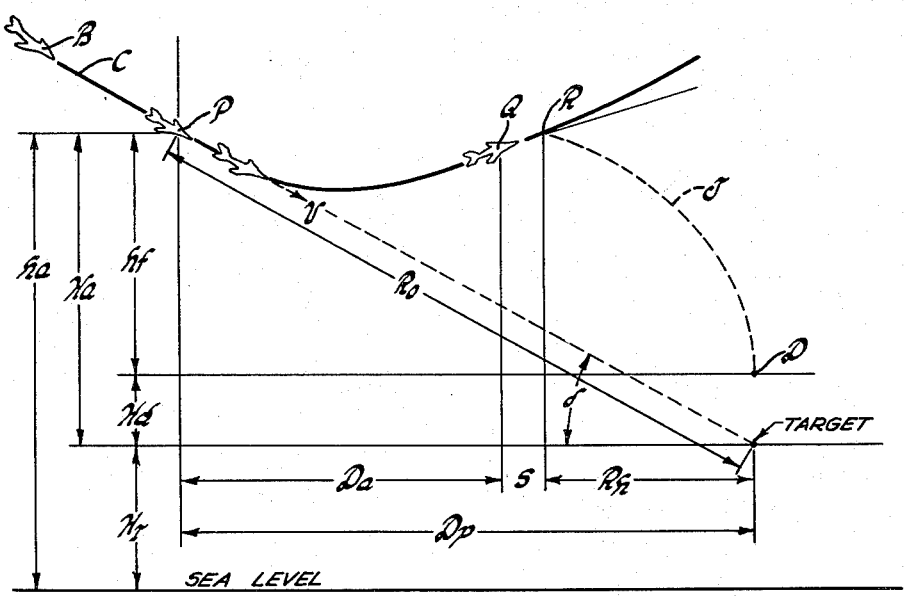
FIGURE 1 is a graphical representation of the geometry of a typical bombing problem which takes into account the mechanism time delay.

Referring now to the drawings, there is illustrated an embodiment of the invention in a bombing computer system of the type which continuously evaluates the vertical and horizontal distance equations relating the predicted bomb trajectory to the position of the aircraft and target in order to develop a bomb release signal corresponding to a selected target. Before describing the instrumentation of the bombing computer system it will be helpful to consider the geometry and formulation of the bombing problem, taking into account the compensation for time delay of the release mechanism.

In FIGURE 1 there is illustrated the geometry of a typical maneuver involved in dive approach toss bombing. Assuming that the target T is the selected objective and that the bomb detonation is to occur at the point D, vertically above the target at a height $H_d$, the bomber aircraft B approaches the target along the path C. The pilot continuously tracks the target with an appropriate sight and when the tracking is satisfactory the pilot manually operates a switch at the initiating or "pickle" point P to initiate operation of certain components of the bombing computer. At the initiating point P the aircraft B is at an altitude above sea level $h_a$ and is approaching the target T with the velocity V at a dive angle $\delta$. At the point P the slant range to target is $R_0$ and the horizontal range to target is designated $D_p$. After the initiating point the dive may be continued until a pull-up maneuver is required by flight conditions or tactical considerations. At any instant following the initiating point the distance of the aircraft from the initiating point P is represented by $D_a$.

In the pull-up maneuver the aircraft reaches a satisfactory bomb release point R in the flight path. The release point R is so correlated with the other parameters of the bombing problem that the aircraft will impart to the bomb a trajectory J which intersects the detonation point D above the target. The horizontal distance traveled by the bomb in the trajectory J is designated $R_h$.

Since the bomb release mechanism of the system is subject to an inherent time delay or operating interval, the distance the aircraft will travel during the time delay must be accounted for to insure accuracy of bomb delivery. In order to effect bomb release from the computed release point R, the bomb release signal must be developed at a point Q which is a horizontal distance S in advance of the release point.

By inspection of FIGURE 1 it is apparent that the distance from the initiating point to the target is equal to the summation of the distance $D_a$ from the initiating point P to the bomb release signal point Q, the distance S from the point Q to bomb release point R, and the distance $R_h$ from the release point R to the detonation point D. This relationship may be expressed mathematically as follows:

$$D_p - D_a - S - R_h = 0 \tag{1}$$

This expression may be termed the bomb release equation.

Figure 2:
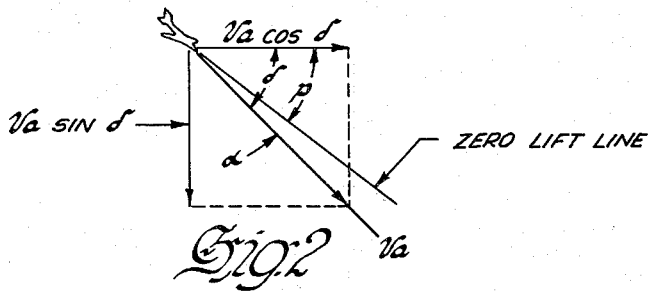
FIGURE 2 is a graphical representation of the geometry involved in deriving certain of the data signals.

In order that the release equation may be mechanized conveniently, it is necessary to express it in terms of readily available data. The distance $D_p$ may be obtained from any suitable distance measuring equipment. It may be derived conveniently from radar as $$D_p = R_0 \cos \delta \qquad (2)$$

where $R_0$ = the slant range from aircraft to target
$\delta = p + \alpha$ and (see Figure 2)

$p$ = pitch angle of the aircraft
$\alpha$ = angle of attack of the aircraft

The distance $D_a$ that the aircraft has traversed from the initiating point P may be derived by integrating the velocity relative to the target with respect to time. This is expressed as $$D_a = \int_P^Q V_T dt \qquad (3)$$

$$V_T = V_a \cos \delta - V_{mT}$$

$$D_a = \int_P^Q (V_a \cos \delta - V_{mT}) dt \qquad (5)$$

where $V_T$ = velocity of the aircraft relative to the target
$V_a$ = velocity of aircraft relative to the air mass
$V_{mT}$ = velocity of the air mass relative to the target The distance S that the aircraft will traverse during the time delay interval of the bomb release mechanism may be expressed as a function of velocity and time. Thus $$S = V_T t_M \qquad (6)$$

where $t_M$ = time delay or operating interval of the bomb release mechanism between receipt of the actuating signal and the response effect.

Since the distance does not exist as a physical reality at the time the release Equation 1 is to be evaluated, it must be a predicted value. This is suitably accomplished with the required degree of accuracy by assuming the aircraft velocity relative to the target will remain constant during the time delay interval and employing the existing value of velocity relative to the target.

The horizontal component $R_h$ of the bomb trajectory may be considered as having two components; namely, (1) the horizontal component $R_{ho}$ in air mass coordinates, and (2) the horizontal component $R_{mT}$ due to the relative motion of the air mass and target.

Thus $\qquad R_h = R_{ho} + R_{mT} \qquad (7)$

The term $R_{ho}$ is readily derived by a known computer by solving the empirical equation:

$$H_f = AT^2 + BT + C \qquad (8)$$
$$R_{ho} = DT^2 + ET + F \qquad (9)$$

where $T$ = the true time of fall of the bomb from the aircraft to the detonation point.
$H_f$ = the distance of fall and the coefficients A, B, C, D, E, and F are of the form:

$A = a_0 + a_1 \sin \delta + a_2 \cos \delta + a_3 V + a_4 V \sin \delta + a_5 V \cos \delta + a_6 V^2 + a_7 V^2 \sin \delta + a_8 V^2 \cos \delta$ and the constants $a_1$, $b_1$, $c_1$, etc. are determined by the method of least squares approximation to the ballistics tables. The term $R_{mT}$ may be derived as a function of air mass velocity relative to the target and the time of fall $$R_{mT} = V_{mT} T \qquad (10)$$

From the foregoing expressions the bomb release Equation 1 may be rewritten as follows:

$$R_0 \cos \delta - \int_P^Q (V_a - V_{mT}) dt - V_T t_M - R_{ho} - V_{mT} T = 0 \qquad (11)$$

The computer system for mechanization of the release Equation 11 to provide a release signal, which accounts for mechanism delay, upon satisfaction of the equation is illustrated in FIGURES 3 and 4. The computer system components for developing and modifying data signal voltages which represent the system parameters are generally conventional and well known in the art. Accordingly, the system is illustrated in schematic fashion for the sake of clarity in emphasizing the invention. The signal voltages and exciting voltages, unless specified otherwise, are alternating voltages. The relative phase of the voltages is designated by the convention of plus and minus symbols in which those voltages with like symbols are of the same phase and those with unlike symbols are opposite in phase. In general, the system comprises a sight 10 for tracking of the selected target and certain data signal sensing devices including the air data computer 12, the vertical reference 14, and the radar system 16. Signal modifying means are provided which include the dive angle servo 18 and the dive angle function generator 20. The function generator 20 supplies signal voltages to the true time servo 22, the wind computer 24, and the present position computer 26 each of which supplies a signal to the release computer 30. The mechanism delay compensation computer 28 also supplies a signal to the release computer 30. The release computer combines the input signals and, upon the occurrence of a predetermined resultant, develops an actuating voltage which is supplied to the release mechanism 32.

The sight 10 is of any suitable type adapted to facilitate accurate tracking of a selected target by the pilot of the aircraft. It is desirably of the type which includes a combining glass 40 upon which is projected a fixed reticle 42 and a movable pipper 44. The movable pipper 44, having a reference position corresponding to the zero lift line of the aircraft, is adjustably positioned in elevation by a servo driven optical projection system in accordance with the attack angle of the aircraft. The position of the pipper then corresponds to the velocity vector of the aircraft. Therefore, the pilot achieves accurate tracking of the target by adjusting the attitude of the craft so that the movable pipper 44 is centered on the target.

In order to develop data signal voltages which represent the system variables, a group of data sensing and converting instruments is provided. The air data computer 12 is a converter system responsive to selected air pressures to develop signal voltages corresponding to certain parameters of the aircraft position and motion. The air data computer may be of a type furnished by Servomechanisms, Inc., currently available as Model No. AXC-129. The computer 12 includes a manually adjustable input member designated $H_T$ for introducing information relative to the height of the selected target above sea level. The computer develops output signal voltages corresponding to the height above the target $H_a$, the true air speed or velocity relative to the air mass $V_a$, the square of the true air speed $V_a^2$, and the attack angle $\alpha$ of the aircraft. The attack angle signal voltage $\alpha$ is applied by a conductor 46 and conductor 48 to the sight 10. The attack angle signal voltage $\alpha$ is also supplied through conductor 50 to the radar system 16 to permit accurate tracking of the target by the radar antenna to develop the signal voltage $R_0$ representative of the slant range from aircraft to target. The vertical reference 14 is suitably a conventional vertical gyroscope pick-off which develops a signal voltage output corresponding to the pitch angle, $p$, of the aircraft. The various data signal voltages are utilized in the computer stages in a manner to be described presently.

The dive angle servo 18 is a closed loop servomechanism which responds to the algebraic sum of pitch and attack angle voltages $p$ and $\alpha$, respectively, to angularly position a mechanical output shaft 52 in accordance with the instantaneous dive angle $\delta$ of the aircraft. The shaft 52 is drivingly connected with the dive angle function generator 20. The dive angle function generator 20 comprises plural resolvers and potentiometers to generate the desired mathematical functions of the input signal voltages. The dive angle function generator is provided with a slant range input signal voltage $R_0$ on conductor 54 from the radar system 16. It is also supplied with true air speed input signal voltages $V_a$ and $V_a^2$ from the air data computer on conductors 56 and 58, respectively.

A group of output signal voltages developed in function generator 20, designated by the notation $f(\delta)f(V_a)$, represent selected functions of the aircraft dive angle and true airspeed. The specific functions involved are not important to the present invention and the notation is employed in the interest of clarity. This group of signal voltages is applied, as indicated, by conductor 60 to the true time servo 22. Another output signal voltage which corresponds to the horizontal distance from aircraft to target, $R_0 \cos \delta$ is developed on conductor 62. An additional voltage which corresponds to the horizontal component of the aircraft velocity relative to the air mass $V_a \cos \delta$ is developed on conductor 64.

The true time servo 22 is an implicit computer which solves an empirical relationship for evaluating the true time of fall, T, of the bomb and the horizontal distance, $R_{ho}$, in air mass coordinates, that the bomb will travel during its fall. The input signal voltages to the true time servo include, in addition to the functions $f(\delta)f(V_a)$, the aircraft elevation signal voltage $H_a$ and the aircraft velocity signal voltages $V_a$ and $V_a^2$ from the air data computer. An additional input to the true time servo is the bomb detonation elevation which may be established by adjustment of the manual control device designated $H_d$. The true time servo solves the following empirical equations:

$$H_f = AT^2 + BT + C \qquad (8)$$
$$R_{ho} = DT^2 + ET + F \qquad (9)$$

The evaluation of these expressions yields a value for $R_{ho}$ which is represented by a signal voltage on the conductor 66 connected to the input of the release computer 30. The evaluation also yields the value of T which is represented by a signal voltage on the conductor 67.

The wind computer 24 is adapted to develop a range wind signal voltage, $V_{mT}$, which corresponds to the velocity of the air mass relative to the target. The wind computer is essentially a closed loop servomechanism which is responsive to the algebraic sum of the horizontal component of aircraft velocity relative to the target and the horizontal component of aircraft velocity relative to the air mass. It comprises a summing and servo amplifier 68 adapted to energize a reversible servo motor 70 having an output shaft 72. A potentiometer 74 having a movable contact 76 connected with the output shaft is excited from a reference voltage source $E_1$. The amplifier receives an input signal voltage corresponding to the velocity of the aircraft relative to the air mass from the function generator 20 through conductor 64 and switch contacts 78. It also receives an input signal voltage corresponding to the velocity of the aircraft relative to the target from the present position computer 26 through a conductor 80 and switch contacts 82. A followup signal voltage is developed by potentiometer 74 and supplied to the amplifier through conductor 84 and switch contacts 86. The amplifier 68 is effective to energize the motor 70 in accordance with the algebraic sum of the input signal voltages and the follow-up voltage. The motor continuously drives the potentiometer contact 76 to reduce the summation to a null value whereby the angular displacement of the servo shaft 72 corresponds to the instantaneous value of the algebraic sum of the input signal voltages. Accordingly, the wind computer develops a signal voltage on the potentiometer contact 76 which corresponds to the instantaneous velocity of the air mass relative to the target by solution of the equation $$V_{mT} = V_T - V_a \cos \delta \qquad (12)$$

The wind computer also includes a potentiometer 88 which is excited from the true time servo through conductor 67 in accordance with the value of time of fall T. It includes a movable contact 90 which is positioned by the shaft 72 in accordance with the velocity of the air mass relative to the target. Therefore a signal voltage is developed on contact 90 corresponding to the horizontal travel of the bomb due to the air mass motion relative to the target according to the equation $$R_{mT} = V_{mT} T \qquad (10)$$

This signal is supplied from contact 90 through conductor 92 to the release computer 30.

In the wind computer the switch contacts 78, 82, and 86 are mechanically ganged together for simultaneous operation by a manually actuable initiating switch 94. When the initiating switch is actuated at the initiating or "pickle" point in the bombing run, the input to the wind computer is interrupted and the servo motor and shaft remain in the angular position existing at the time of interruption. Accordingly, in the wind computer the information relative to the velocity of the air mass developed at the initiating point is memorized throughout the remainder of the bombing run.

The present position computer 26 is adapted to develop a signal voltage corresponding to the instantaneous horizontal distance from the aircraft to the target. Prior to the initiating point P the present position computer is operated as a servo repeater. At the initiating point P the horizontal distance to target is memorized and the present position computer operation is changed to that of an integrator. The present position computer comprises a summing and servo amplifier 96 which is adapted to energize, through conductor 98, a servo motor 100 having a servo shaft 102. A follow-up potentiometer 104 is excited from a reference voltage source $E_2$ and has a movable contact 106 connected with the shaft 102. Prior to the initiating point the amplifier 96 receives an input signal voltage corresponding to the horizontal component of the slant range from the aircraft to the target through conductor 62 and switch contacts 112. Accordingly the servo motor 100 displaces the contact 106 to develop a follow-up signal voltage which is applied through conductor 114 to the amplifier to reduce the algebraic sum of the input and follow-up voltages to a null value. Therefore the servo shaft is angularly positioned in accordance with the instantaneous value of the horizontal distance to target. A distance to target signal voltage $D_p$ is developed on the contact 106. A rate or velocity signal voltage $V_T$ corresponding to the first time derivative of the horizontal distance to target is developed by a tachometer 108 driven by motor 100. This signal voltage is supplied by conductor 110 to conductor 80 and thence to the input of the wind computer 24. It may also be applied through conductor 116 as a servo stabilization signal to the amplifier 96.

At the initiating point P the connections of the present position computer are changed to provide operation as an integrator. The input to the amplifier includes the aircraft velocity signal voltage $V_a \cos \delta$ from the function generator 20 through conductor 64 and switch contacts 112 and the range wind velocity signal voltage $V_{mT}$ from wind computer 24 through conductor 118 and switch contacts 120. The switch contacts 112 and 120 are actuable in unison by initiating switch 94 through linkage 122. With the contacts 112 and 120 in the lower position the system operates as a servo integrator by virtue of the rate signal feedback through conductor 116 and the servo shaft 102 is displaced according to $$D_a = \int_P^Q (V_a \cos \delta - V_{mT}) dt \qquad (5)$$

Since the position of shaft 102 and potentiometer contact 106, at the time of actuation of initiating switch 94, correspond to the horizontal distance to target $D_p$, the signal voltage derived from the potentiometer becomes $D_p - D_a$ which is supplied through conductors 114 and 118 to the release computer 30 and which represents the instantaneous distance to the target. For this condition of operation, the output of the tachometer generator 108 is the first time derivative of the horizontal distance from the aircraft to the target or aircraft velocity, $V_T$. This signal voltage is supplied through conductor 124 to the mechanism delay compensation computer 28.

The compensation computer 28 comprises a multiplication circuit such as potentiometer 126 connected between the conductor 124 and a point of common reference potential. The potentiometer 126 includes a movable contact 128 which may be adjustably positioned by the manually actuable control element 127. The movable contact 128 is electrically connected through conductor 130 to the input of the release computer 30.

The release computer 30 comprises a summing amplifier 132 which is adapted to algebraically combine a plurality of input signal voltages and to develop an output signal voltage which is proportional to the algebraic sum of input voltages. The summing amplifier output voltage is applied through conductor 134 to a phase sensitive amplifier 136. The phase sensitive amplifier is adapted to provide an actuating signal voltage output in response to an input signal voltage of null value or upon the occurrence of phase reversal of the input signal voltage. The phase sensitive amplifier 136 develops an actuating voltage on conductor 138 to control energization of the release mechanism 32.

The release mechanism 32 is of the electromechanical type and includes a solenoid relay 140 connected between conductor 138 and a point of reference potential through switch contacts 142. The switch contacts 142 are normally open and are actuable to the closed position by the initiating switch 94 through a linkage 144. The solenoid relay 140 has an armature 146 connected to a mechanical release apparatus 148. The release mechanism 32 has a definite operating time or time delay, which is characteristic of all electromechanical actuators, and the time delay is a known quantity which may be predetermined. This time delay of the release mechanism 32 results in actual release of a bomb from the aircraft at a definite time interval after the receipt of an actuating signal.

The operation of the inventive computer system may be understood from a consideration of a typical bombing maneuver, for example, toss bombing in a dive approach. It will be assumed that the selected target has been identified and that the pre-flight procedure on the bombing computer system has been executed including the establishment of the target altitude $H_T$ in the air data computer and the desired detonation altitude $H_d$ in the true time servo. The mechanism delay associated with the bomb release mechanism 32 is established by adjustment of the control element 127 to displace 128 an amount proportional to the known time delay.

With the bombing aircraft in flight and approaching the selected target the pilot commences tracking of the target by use of the sight 10. The sight is continuously supplied with signal voltage proportional to the angle of attack of the aircraft and the movable pipper 44 is positioned accordingly. When the attitude of the aircraft is maintained so that the movable pipper 44 coincides with the selected target, tracking of the target is satisfactory. In this condition the radar antenna is properly directed toward the target and the slant range to target is continuously developed by the radar system 16. The dive angle servo 18 is continuously provided with a signal voltage proportional to the attack angle and the signal voltage proportional to the pitch angle of the aircraft. The dive angle servo algebraically combines these input signal voltages and causes the servo shaft to assume an angular position corresponding to the instantaneous dive angle of the aircraft. Accordingly, the dive angle function generator 20 continuously supplies data signal voltages through the conductor 60 to the true time servo. The conductor 62 is excited with signal voltage proportional to the horizontal component of the slant range to target and the conductor 64, connected to the present position computer, is excited with a signal voltage proportional to the horizontal component of true air speed of the aircraft.

In the true time servo 22 the data signal input voltages are continuously evaluated to develop a signal voltage corresponding to the horizontal trajectory of the bomb in the air mass.

The present position computer 26 during the acquisition or initial tracking phase is continuously supplied, from the dive angle function generator 20, with a signal voltage on conductor 62 proportional to the horizontal component of the slant range to target. The amplifier 86 and the servo motor 100 are energized to position the servo shaft 102 in an angular position corresponding to the horizontal range from aircraft to target. This horizontal range signal voltage is derived from the potentiometer 104 on the movable contact 106 and supplied as a follow-up signal to the input of the amplifier 96. The servo motor 100 also drives the tachometer generator 108 which generates the signal voltage proportional to the first time derivative or the time rate of change of the horizontal range from aircraft to target. This signal voltage corresponds to the velocity of the aircraft relative to the target and is supplied through the conductor 80 to the input of the wind computer 24.

During this initial tracking stage the wind computer 24 develops an output signal voltage proportional to the velocity of the air mass relative to the target. The servo and summing amplifier 68 and the servo motor 70 cause the servo shaft 72 to assume an angular position corresponding to the algebraic sum of the input signal voltages which correspond to the aircraft velocity relative to the air mass and relative to the target. This angular position of output shaft 72 is converted to a signal voltage, corresponding air mass velocity relative to the target, by the potentiometer 74. This signal voltage is supplied through conductor 118 to the present position computer 26.

The wind computer 24 also develops a signal voltage corresponding to the horizontal component of the bomb trajectory imparted by the motion of the air mass. The potentiometer 88 is excited with the true time signal voltage from conductor 67 and has the movable contact positioned in accordance with the air mass velocity. Thus, the product of these quantities is derived as a signal voltage on conductor 92 and applied to the bomb release computer 30.

The initial tracking phase of the target is terminated by the pilot when the tracking is satisfactory by the actuation of the initiating or "pickle" switch 94. Actuation of the switch 94 is effective to interrupt the switch contacts 78, 82 and 86 in the input of the wind computer 24. As a result, the wind computer servo is "frozen" in position and the output shaft 72 which drives the potentiometer contact 76 memorizes the value of air mass velocity at the initiating point. This memorized value, represented by the signal voltage derived from the potentiometer 74, is applied to the input of the present position computer through conductor 118.

Actuation of the initiating switch 94 is also effective to operate the switch contacts 120 and 112 to complete the circuits of conductors 118 and 64, respectively, to the input of the present position computer 26. Accordingly, the present position computer commences to operate as an integrator and is supplied with the input signal voltage proportional to the memorized value of air mass velocity and the signal voltage proportional to the horizontal component of the air speed of the aircraft. The present position computer 26 operates as an integrator because the time derivative feedback signal voltage from the rate generator 108 produces a component in the output of the servo amplifier proportional to the time integral of the input signal voltage. Accordingly the servo motor 100 and the output shaft 102 are displaced through an angle corresponding to the time integral of the summation of the input signal voltages. Since the servo shaft position initially represented the distance to target at the initiating point, the shaft position and voltage on potentiometer contact 106 corresponds to the instantaneous distance from the aircraft to the target. This output signal voltage is applied by conductor 114 as a follow-up signal to the summing and servo amplifier 96 and is applied by conductor 118 to the input of the release computer 30.

As previously described, following the actuation of the initiating switch 94, the present position computer develops a signal voltage proportional to the velocity of the aircraft relative to the target on conductor 124. This signal voltage is applied across the potentiometer 126 in the compensation computer 28. The movable contact 128 of the potentiometer is pre-set to a position corresponding to the time delay of the bomb release mechanism. Accordingly the output signal voltage developed on the movable contact is proportional to the product of the instantaneous velocity of the aircraft and the time delay of the bomb release mechanism. This signal voltage is applied by conductor 130 to the bomb release computer 30.

The bomb release computer 30 is continuously supplied, subsequent to the actuation of the initiating switch, with plural signal voltages which correspond to the terms of the bomb release equation. The summing amplifier 132, which develops an output voltage proportional to the algebraic sum of the input signal voltages, is connected with the phase sensitive amplifier 136. The phase sensitive amplifier 136 is responsive to a null summation of the input signal voltages which occurs upon phase reversal of the amplifier output voltage to develop an actuating voltage for the release mechanism 32.

The actuating voltage is applied to the release mechanism through the switch contacts 142 which are closed by the initiating switch 94. Therefore, when the input signal voltages to the bomb release computer 30 assume the necessary values to satisfy the bomb release equation, the solenoid relay 140 is energized to cause bomb release. Because of the inherent time delay of the bomb release mechanism 32 the actual bomb release from the aircraft follows the application of the actuating voltage by the known value of time delay. However, the signal voltage from the compensation computer 28 causes the actuating voltage to anticipate the computed release point by the predicted distance the aircraft will travel at the existing speed during the delay interval. Accordingly, the actual release point of the bomb coincides with the computed release point.

Although the description of this invention has been given with respect to a particular embodiment it is not to be construed in a limiting sense. Many variations and modifications within the spirit and scope of the invention will now occur to those skilled in the art. For a definition of the invention, reference is made to the appended claims.

We claim:

1. A bombing computer system for aircraft adapted to effect release of a bomb from the aircraft at a point where the aircraft path is tangent to a predicted bomb trajectory intersecting a selected target comprising means for deriving functionally related signal quantities which determine the desired release point and including means for deriving a signal quantity proportional to aircraft velocity, a release computer receiving said functionally related signal quantities for developing an actuating signal upon a predetermined value thereof, a release mechanism receiving the actuating signal from the release computer for actuation thereby, said release mechanism having a known time delay between application of the actuating signal and bomb release, a compensation computer receiving the velocity signal quantity and having an input means for introducing a quantity proportional to said time delay for developing a compensation signal proportional to the distance traversed by the aircraft during said time delay, said compensation computer being connected to the release computer to supply the compensation signal thereto whereby the actual release point and desired release point coincide.

2. A bomb release system for aircraft comprising a bomb release mechanism having a known time delay between application of an actuating voltage and bomb release, means for deriving plural data signal voltages including a first data signal voltage representing the horizontal component of the distance between an acquisition point and the target, a second data signal voltage representing the horizontal distance the aircraft has flown from the acquisition point toward the target, and a third data signal voltage corresponding to the horizontal component of the bomb trajectory so that the desired release point corresponding to the target is determined when the summation of the first data signal voltage is equal to the sum of the second and third data signal voltages, means for deriving a signal voltage corresponding to aircraft velocity, a computer receiving said velocity signal voltage and having means for introducing a quantity corresponding to said time delay for developing a compensation signal voltage proportional to the distance traversed by the aircraft during said time delay, a summing circuit receiving said data signal voltages and said compensation signal voltage and combining the first data signal voltage in opposition to the sum of the second and third data signal voltages and the compensation signal voltage and a null responsive circuit receiving the output of the summing circuit and coupled with the bomb release mechanism to cause actuation of the mechanism in advance of the desired release point so that the aircraft traverses the remaining distance to said release point during said time delay.

References Cited in the file of this patent

UNITED STATES PATENTS

| | | |
|---|---|---|
| 2,433,284 | Luck | Dec. 23, 1947 |
| 2,688,131 | Kiebert | Aug. 21, 1954 |
| 2,733,436 | Doba et al. | June 31, 1956 |